July 7, 1964     M. J. SWATSICK     3,139,740
AUGER TYPE ICE CHIP MAKING MACHINE Filed April 30, 1962                      2 Sheets-Sheet 1

INVENTOR.
MICHAEL J. SWATSICK
BY
ATTORNEY

July 7, 1964
M. J. SWATSICK
3,139,740
AUGER TYPE ICE CHIP MAKING MACHINE
Filed April 30, 1962
2 Sheets-Sheet 2
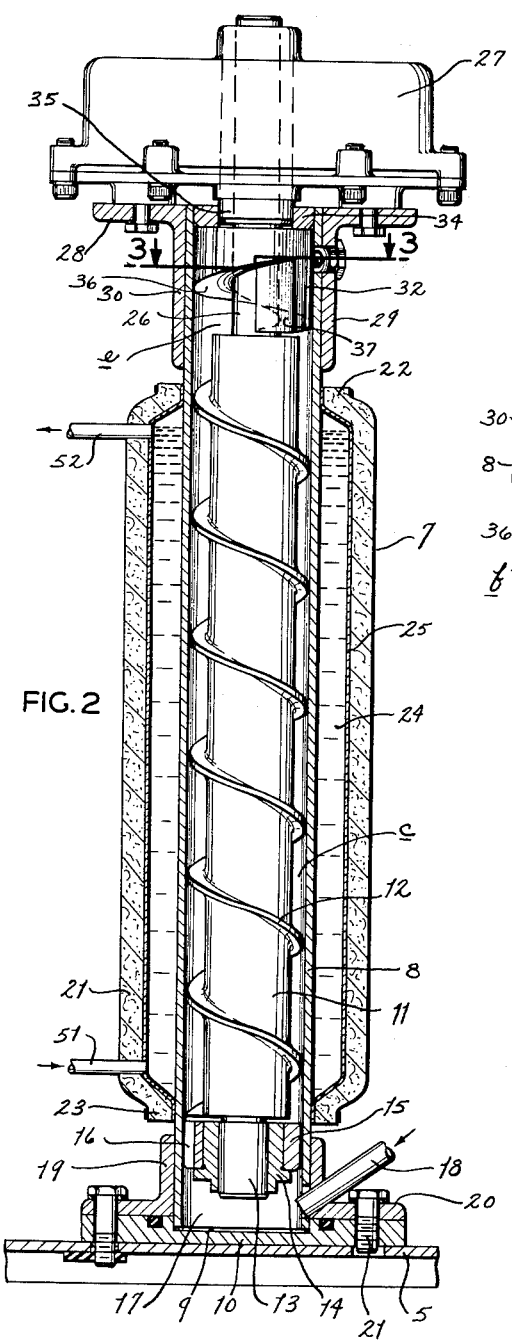
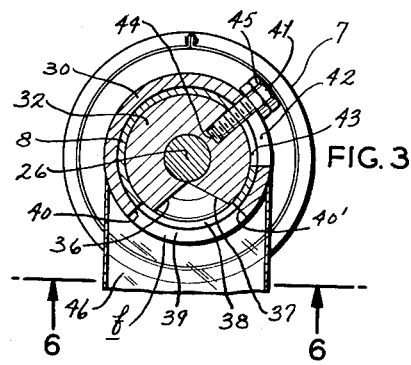
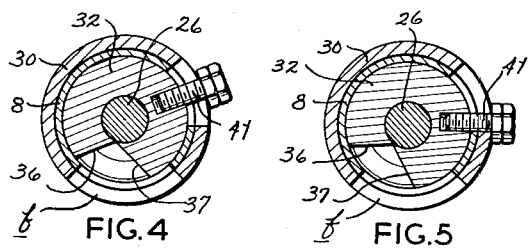
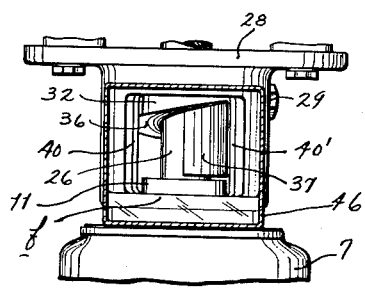
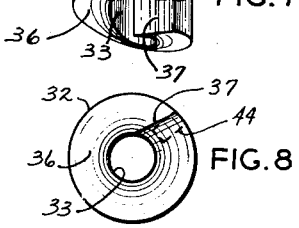
INVENTOR.
MICHAEL J. SWATSICK
BY
Ralph W. Kalish
ATTORNEY 3,139,740
AUGER TYPE ICE CHIP MAKING MACHINE
Michael J. Swatsick, 1900 Nebraska Ave.,
St. Louis 4, Mo.
Filed Apr. 30, 1962, Ser. No. 191,109
12 Claims. (Cl. 62—320)

This invention relates generally to refrigeration and, more particularly, to certain new and useful improvements in an ice chip making machine.

It is an object of the present invention to provide an ice chip making machine adapted for reliable production of ice chips which are unusually hard and clear; being well-defined and relatively "dry"; and resistant to premature melting.

It is another object of the present invention to provide an ice chip making machine incorporating, with a cylindrical upstanding freezing chamber, novel adjustable means for compressing and effecting chipping of freezing masses presented thereto for the production and discharging of ice chips of varying size having the characteristics above recited.

It is a further object of the present invention to provide an ice chip making machine which has a marked simplicity of parts; which is stable in operation and of uniformly efficient performance; which does not require constant attendance during operation; which is resistant to breakdown; which may be economically manufactured and operated; and which may be produced in a most compact size for commercial or domestic usage.

These and other detailed objects are obtained by the structures illustrated in the accompanying drawings (two sheets) in which—

FIGURE 2 is a vertical transverse sectional view taken on the line 2—2 of FIGURE 1, but showing the gear box unsectioned.

FIGURE 3 is a horizontal transverse sectional view taken on the line 3—3 of FIGURE 2.

FIGURE 4 is a horizontal transverse sectional view taken substantially on the line 3—3 of FIGURE 2, but showing the ice-compressing member in another position of adjustment.

FIGURE 5 is a horizontal transverse sectional view taken substantially on the line 3—3 of FIGURE 2, but showing the ice-compressing member in a further position of adjustment.

FIGURE 6 is a vertical view taken on the line 6—6 of FIGURE 3.

FIGURE 7 is a perspective view of the ice-compressing member.

FIGURE 8 is a bottom plan view of the ice-compressing member.

Figure 1:
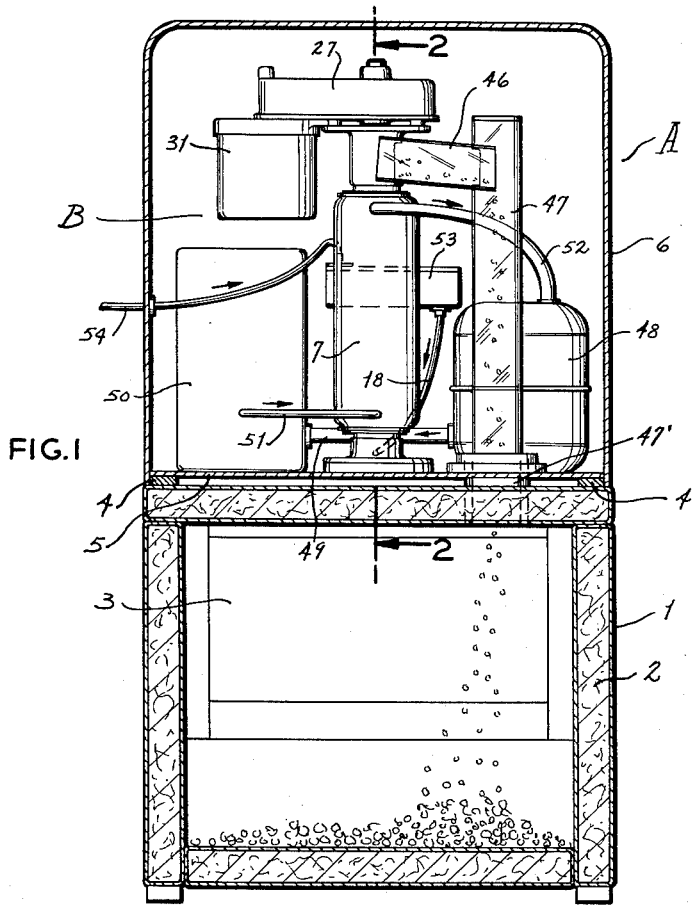
FIGURE 1 is a front view of an ice chip making machine constructed in accordance with, and embodying, the present invention, with the lower cabinet and upper housing portions being broken away.

Referring now by reference characters to the drawings which illustrate the preferred embodiment of the present invention, A generally designates an ice chip making machine which comprises an enclosed lower cabinet or ice receptacle 1 having insulated walls, as indicated at 2; there being a hinged closure 3 in the front wall of said cabinet to provide ready access to the interior thereof for ice removal. Disposed upon the upper surface of the top wall of cabinet 1 are spaced-apart supports 4 for the base plate 5 of ice chip making apparatus B, which may be enclosed by housing 6, as of sheet metal.

As may best be seen in FIGURE 2, said ice chip making apparatus B incorporates a freezing column 7 having a relatively thin-walled, metallic, open-ended cylinder 8 disposed upright within an upwardly opening recess 9 formed centrally within a base block 10, and within said cylinder 8 is coaxially disposed a vertically presented shaft 11 carrying a helical auger blade or spiral 12 to define what may often be termed a "screw-type conveyor" or "auger." The cylinder 8 thus defines a freezing chamber $c$. Said shaft 11 at its lower end is reduced, as at 13, for journaling within a bearing 14, suitably supported within a mounting collar 15 fixed in cylinder 8; said collar 15 having an opening 16 for effecting communication between freezing chamber $c$ and a compartment 17 defined by the cylinder 8, block 10, and shaft 11; there being a water inlet pipe 18 extending from a source of water (not shown) and opening into compartment 17. The helical blade 12 of shaft 11 is of such width that its outer end edge is closely adjacent, but spaced from, the inner surface of cylinder 8.

Surrounding the outer face of cylinder 8 in its lower portion is a riser block 19 having a base flange 20 resting upon and secured to base block 10 and base plate 5, as by bolts 21. Disposed encirclingly of cylinder 8, above riser block 19, is an insulating jacket or sleeve 21 having upper and lower neck portions, as at 22, 23, respectively, with an intervening major body portion of increased diameter to define with cylinder 8 an annular spacing or heat transfer compartment 24, there being an outer shell or liner 25 presented against the inner face of jacket 21 for defining the outer wall of compartment 24. The diametral reduction of necks 22, 23 of jacket 21 effects enclosing of the upper and lower ends of compartment 24 for promoting efficient heat transfer. At its upper end, shaft 11 is turned down or diametrally reduced, as at 26, for extension into, and engagement within a gear box 27 which is presented overlyingly of the upper end of freezing column 7 and being secured upon the radial flange 28 of a top mounting member 29, having a relatively elongated sleeve portion 30 for snug presentation about the upper end portion of cylinder 8 above jacket 21; the said gear box 27 resting upon the upper end edge of said cylinder 8. By reduction gears (not shown) located within gear box 27, shaft 11 is suitably connected to the drive shaft (not shown) of a prime mover 31 located within a housing supported, and depending, from gear box 27.

Disposed above the upper end of the spiral carrying portion of shaft 11 is an ice-compressing and crushing member 32, fabricated from a cylindrical section, as of brass or the like, and having a central bore 33 for extension therethrough of the upper reduced end 13 of shaft 11, which latter is free to rotate therein. The upper end face of member 32 is flat for abutment against the under face of an annular closure 34 for the upper end of cylinder 8, being secured on a collar 35 receiving shaft 11. The downwardly directed or lower surface 36 of member 32 is contoured to provide an upwardly progressing spiral, 360 degrees in extent and transversely extending upwardly and outwardly from bore 33 at a relatively shallow angle, as of approximately 20 degrees. The provision of spiral surface 36 causes the development of a vertical ice-deflecting surface 37, axially parallel to member 32 but transversely inclined outwardly from bore 33. The lowermost end of member 32 is spaced immediately above the upper end of the diametrally increased portion of shaft 11 (FIGURE 6), preventing undesired obstructing contact therewith during rotation of the latter. It will be noted that cylinder 8, the spiral under-surface 36 of member 32, and the said upper end of shaft 11 co-act to define an ice-receiving compartment, indicated generally at $e$.

Cylinder 8 and sleeve portion 30 of mounting member 29 are provided with arcuate, registering apertures 38, 39, respectively, for conjunctively defining an ice discharge opening $f$ for said ice-receiving compartment $e$. Each said aperture 38, 39 is provided with opposed vertical side edges 40, 40', with the former cooperating with deflecting surface 37 of ice-compressing member 32 for controlling the effective width of ice discharge opening $f$, for purposes presently appearing.

Ice-compressing and crushing member 32 may be adjusted relatively circumferentially to the reduced end 13 of shaft 11 by appropriate setting of a set screw 41 extending through aligned, narrow, slot-like openings 42, 43, cut or otherwise provided in sleeve 30 of mounting member 29 and cylinder 8, respectively, being spaced from apertures 38, 39. The inner end of set screw 41 is received within a drilled and tapped radially extending bore 44 in member 32, with its outer end or head 45 being of greater cross section than the height of openings 42, 43, so that upon inward threading, the same may be brought to bear tightly against the outer face of sleeve 30 for steadfastly retaining member 32 in its selected position. Thus, by operation of set screw 41, ice-compressing and crushing member 32 may be adjusted relative to shaft 11 so as to locate deflecting surface 37 with respect to aperture sides 40 to relatively enlarge (FIGURE 3) or relatively reduce (FIGURES 4 and 5) the effective width of discharge opening $f$. As will be discussed hereinbelow, the narrower the said effective width of opening $f$, the smaller will be the ice particles produced by machine A.

Provided for communication with ice discharge opening $f$ is a downwardly and outwardly inclined tubular chute or passageway 46, which may, if desired, for ready inspection purposes, be formed of a transparent plastic material, and which connects with the upper end of a vertically presented ice delivery column 47. Said column 47 may also be made of transparent plastic material and opens at its lower end within a cooperating cylindrical member 47' extending through aligned openings in base plate 5 and the upper wall of cabinet 1, so that ice chips received within said column 47 will, through gravity, descend into cabinet 1 for storage preparatory to usage.

Figure 9:
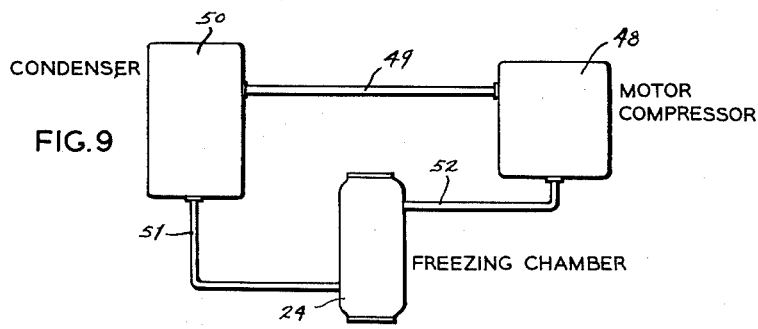
FIGURE 9 is a diagrammatic presentation of the refrigeration system of the present invention.

The refrigerating system of the present invention is schematically presented in FIGURE 9 and comprises a motor-compressor 48 connected by a conduit 49 to a condenser 50, which latter is, in turn, connected by pipe 51 to the lower end of compartment 24, with a return conduit 52 progressing from the upper portion of compartment 24 to motor compressor 48 for completing the refrigerant circuit. Accordingly, the refrigerant is compressed and delivered to condenser 50 for reduction to gaseous form and in such state is delivered to the cooling compartment 24; traveling upwardly therethrough for drawing heat from within freezing chamber $c$, so as to lower the temperature substantially to the freezing level of liquids (water) admitted therein. The spent refrigerant is returned through conduit 52 to motor-compressor 48 for ultimate recycling. By means of insulated jacket 21, undesirable heat transfer between cooling compartment 24 and the ambient atmosphere is prevented, whereby markedly high efficiency of condensation of liquid within cylinder 8 is obtained.

Adjacent the exterior of jacket 21 and elevated above base plate 5 for gravity-flow purposes there is provided a float-controlled water reservoir 53 having an inlet passage 54 from a suitable source of water and being connected in its lower portion to pipe 18, which, as stated above, opens into compartment 17 for delivery of water to the lower end portion of freezing chamber $c$, wherein water is forced upwardly by helical blade 12 as well as by the force of incoming water, and subjected to the cooling action of the refrigerant flowing upwardly in cooling compartment 24 so that, as the water ascends freezing chamber $c$, it will be increasingly condensed, whereby, upon arrival at ice-receiving compartment $e$, a wet freezing mass will be presented.

It is to be recognized that refrigerating coils may replace the single open jacket of the flooding type shown, since the means for effecting heat transfer can be in accordance with any well known device and need not necessarily be restricted to the particular device shown in the drawing.

In actual usage, the freezing mass will move upwardly of chamber $c$ along helical blade 12 and will be forced beyond the end of said blade 12 into compressive contact against the spiral under-surface 36 of member 32 within said compartment $e$; said mass traveling therealong under the upward force of the underlying component of the mass until it reaches the upper limit of said spiral 36, whereat it will be directed against vertical surface 37 for deflection thereby radially outwardly for movement through discharge opening $f$. The mass being thus forced between said surface 37 and the aligned side margins 40 of openings 38, 39, will be received within chute 46 for direction into storage cabinet 1. The forcing of the freezing mass against spiral surface 36 serves to compress or condense same, having the result of "drying" such mass, so that the product will be hard, and resistant to premature melting. The squeezing of the compressed material through discharge opening $f$ will serve to crush or break same into discrete particles or chips, the size of which is directly related to the width of the effective opening of discharge opening $f$, as the narrower the same, the smaller the particles produced. Thus, deflecting surface 37 and the cooperating aperture edges co-act as stationary jaws, causing the mass moving therebetween to be broken into chipped formation.

As thus shown hereinabove, the adjustablility of ice-compressing and crushing member 32 endows machine A with extreme versatility, since it adapts same for producing ice chips of pre-selected size; with the mechanism for adjustment being designed for easy operation, not requiring the services of skilled personnel, and being of such simple, yet efficient, construction as to be most durable and wear-resistant.

Ice-compressing and crushing member 32 is a most unique and critical element in that the novel spiral undersurface provides, as it were, a stationary force against which the upwardly moving freezing mass will be progressively compressed until it reaches a developed state of condensation for discharge of particles having the unusual and highly desired characteristics as aforesaid. Member 32 may be most economically produced and being devoid of complex components, especially conduces to the overall stability of machine A. Ice chips produced by machine A maintain their superb qualities during storage and do not tend to coalesce, but rather retain their relatively "dry," independent discrete form.

As is apparent from the foregoing, machine A has a marked simplicity of parts which are highly resistant to breakdown. The said machine operates automatically; does not require constant attendance and, hence, has proved most economical in operation. It is quite apparent that well known means may be utilized for turning the machine off after the receptacle has been filled to a certain point, such as, for instance, by a thermal couple, or the like.

It is understood that changes and modifications in the form, construction, arrangement, and combination of the several parts of the ice chip making machine may be made and substituted for those herein shown and described without departing from the nature and principle of the present invention.

Having thus described my invention, what I claim and desire to secure by Letters Patent is:

1. An ice chip making machine comprising structure defining a freezing chamber and an ice-receiving compartment located thereabove, a shaft mounted in said freezing chamber, means for rotating said shaft, a helical auger blade provided on said shaft for conveying a freezing mass through said chamber into said ice-receiving compartment, and an ice-compressing and crushing member spacedly mounted above said auger blade and defining the upper end of said ice-receiving compartment for compressing a freezing mass delivered thereagainst by said blade, said ice-compressing and crushing member having a downwardly directed spiral of greater than one hundred and eighty degrees formed on its under-surface, said ice-compressing and crushing member also having a vertical ice-deflecting surface extending downwardly from the upper end of the said spiral.

2. An ice chip making machine as defined in claim 1, and further characterized by said ice-receiving compartment having an ice discharge opening, and means for controlling the effective size of said opening.

3. An ice chip making machine comprising means defining a vertically presented freezing chamber and an ice-receiving compartment located thereabove, a shaft vertically mounted in said freezing chamber and extending at its upper end into said ice-receiving compartment, means for rotating said shaft, a helical auger blade provided on said shaft within said freezing chamber for conveying a freezing mass therethrough and into said ice-receiving compartment, an ice-compressing and crushing member disposed about said shaft upwardly of said freezing chamber for journaling of the latter therein, said ice-compressing and crushing member having a downwardly directed spiral of greater than one hundred and eighty degrees formed on its downwardly directed surface for defining the upper end of said ice-receiving compartment and for delivery thereagainst of the freezing mass conveyed by said auger blade, said ice-compressing and crushing member having a vertical ice-deflecting surface extending downwardly from the upper end of said spiral, said ice-receiving compartment having a lateral ice discharge opening, and means for adjusting said ice-compressing and crushing member circumferentially of said shaft and relatively to said ice discharge opening.

4. An ice chip making machine as defined in claim 3, and further characterized by said ice-compressing and crushing member having axial bore for extension therethrough of the shaft, said spiral being transversely outwardly and upwardly inclined, and said deflecting surface extending from said bore to the outer face of ice-compressing and crushing member.

5. An ice chip making machine as defined in claim 3 and further characterized by said ice discharge opening having vertical side edges whereby said vertical deflecting surface and the opposed side edge of the discharge opening cooperate to define the effective width of such opening to serve as stationary crushing jaws for ice moving therethrough.

6. An ice chip making machine as defined in claim 5, and further characterized by said means for adjusting said ice-compressing and crushing member with respect to the shaft comprising a set screw engageable within a threaded radial opening in said ice-compressing and crushing member; there being an opening in the outer wall of said ice-receiving compartment for extension of said set screw outwardly therethrough.

7. An ice chip making machine as defined in claim 1, and further characterized by said spiral having an extent of three hundred and sixty degrees.

8. An ice chip making machine as defined in claim 1, and further characterized by said spiral having a transverse inclination of approximately twenty degrees to the vertical.

9. An ice chip making machine as defined in claim 1, and further characterized by said spiral having an extent of three hundred and sixty degrees and a transverse inclination to the vertical of approximately twenty degrees.

10. An ice chip making machine as defined in claim 1, and further characterized by the said ice-deflecting surface having its vertical axis being parallel to the axis of said spiral.

11. In means positioned adjacent the discharge end of a freezing column of an ice producing machine, which freezing column is provided with a rotating auger, said means comprising a fixed ice-compressing and crushing member of general cylindrical form and having a downwardly directed under surface, a spiral of three hundred and sixty degrees being formed on the under surface of said member and progressing upwardly from the lower end thereof, said spiral having a transverse inclination of approximately twenty degrees to the vertical, and a vertically extending ice-deflecting surface provided adjacent the upper end of said spiral and extending downwardly therefrom, the major axis of said ice-deflecting surface being parallel to the longitudinal axis of said spiral.

12. An ice-chip making machine as defined in claim 1 and further characterized by said ice-receiving compartment having a discharge outlet with vertical side portions, and means for selectively controlling the distance between said ice-deflecting surface and at least one of the vertical side portions of said opening for determining the effective width thereof.

References Cited in the file of this patent
UNITED STATES PATENTS

| | | |
|---|---|---|
| 2,753,694 | Trow | July 10, 1956 |
| 2,825,209 | Nelson | Mar. 4, 1958 |
| 2,877,632 | Chaplik | Mar. 17, 1959 |
| 2,962,878 | Keller | Dec. 6, 1960 |